United States Patent Office 3,369,054
Patented Feb. 13, 1968

3,369,054
PREPARATION OF TERMINAL
ACETYLENIC COMPOUNDS
Robert P. Zelinski and Ralph C. Farrar, Bartlesville,
Okla., assignors to Phillips Petroleum Company, a
corporation of Delaware
No Drawing. Filed Sept. 2, 1965, Ser. No. 484,719
11 Claims. (Cl. 260—678)

ABSTRACT OF THE DISCLOSURE

A process for the isomerization of allenes, 1,2-dienes, to terminally bonded acetylenic compounds. Allenes are contacted substantially in the liquid phase with organoalkali metal compounds. This produces a metalated terminally bonded acetylenic compound which when hydrolyzed produces the terminally bonded acetylenic compound.

---

This invention relates to the production of terminally bonded acetylenic compounds. In one of its aspects, it relates to a process for the production of terminally bonded acetylenes by reacting an allene with an organoalkali metal compound and hydrolyzing the resulting product. In another of its aspects, it relates to a process for the production of a polymetalated terminally bonded acetylenic compound by reacting an allene with an organoalkali metal compound. In another of its aspects, the invention relates to a process as hereinbefore described in which the reaction is carried out in the presence of a liquid hydrocarbon diluent. In a still further aspect of the invention, it relates to a process as hereinbefore described wherein the reaction is carried out in a polar organic diluent.

Isomerization of 1,2-dienes, or allenes, to 1-acetylenes is known. However, the prior art processes have used vapor-phase and elevated temperature and required the use of a fluorine-containing silica and/or alumina catalyst. We have now discovered that the reaction need not be carried out in the vapor-phase at higher temperatures. We have found that 1,2-dienes, or allenes, can be isomerized to 1-acetylenes in a liquid phase with the use of an alkali metal organic compound as the catalyst.

By various aspects of this invention one or more of the following, or other objects can be obtained.

It is an object of this invention to provide a process for the production of terminally bonded acetylenic compounds.

It is a further object of this invention to provide a process for the production of metalated acetylenic compounds.

It is a still further object of this invention to provide a process for isomerizing allenes to terminally bonded acetylenic compounds using a liquid phase reaction medium.

It is a still further object of this invention to provide a process for the production of metalated terminally bonded acetylenic compounds from allenes using a liquid phase reaction medium.

Other aspects, objects, and the several advantages of this invention are apparent to one skilled in the art from a study of this disclosure and the appended claims.

According to the invention, terminal acetylenes are prepared from allenes by isomerizing the allene in the presence of an organoalkali metal compound and hydrolyzing the metalated acetylene to the corresponding hydrocarbon. The terminally bonded acetylene can be recovered from the reaction mixture by distillation or other suitable separation means.

Allenes isomerized in accordance with the present process can be represented by the formula

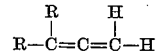

wherein R is selected from the group consisting of hydrogen, alkyl, cycloalkyl, aryl, cycloalkylalkyl, aralkyl, alkylcycloalkyl, arylcycloalky, alkaryl, and cycloalkaryl radicals containing from 1 to 12 carbon atoms. Illustrative of compounds that can be employed are the following:

allene (propadiene)
methylallene (1,2-butadiene)
1,2-pentadiene
1,2-octadiene
1,2-dodecadiene
1,2-pentadecadiene
3-methyl-1,2-heptadiene
4-cyclohexyl-1,2-butadiene
3-phenyl-1,2-butadiene
4-phenyl-1,2-butadiene
6-(4-tolyl)1,2-hexadiene
3-methyl-5-phenyl-1,2-pentadiene
3-dodecyl-1,2-pentadecadiene
5(3,4-dimethylcyclopentyl)-1,2-pentadiene
5-ethyl-7-phenyl-1,2-heptadiene
3(3-phenylcyclopentyl)-1,2-heptadiene
1,1-dicyclohexylpropadiene
phenylpropadiene
2-naphthylpropadiene
4-methylcyclohexylpropadiene
3-phenylcyclohexylpropadiene
4-cyclopentylphenylpropadiene
9-cyclohexyl-1,2-nonadiene
(2-methyl-4-n-hexylcyclopentyl)propadiene
3,5-diisopropylphenylpropadiene and the like.

Organoalkali metals which can be employed as isomerizing agents can be represented by the formula $R'M_x$ wherein $R'$ is a saturated or unsaturated (ethylenic or acetylenic) aliphatic, cycloaliphatic, or aromatic radical containing from 1 to 20 carbon atoms, M is an alkali metal, and $x$ is an integer from 1 to 4.

Examples of organoalkali metals which can be used are:

methylsodium
isopropylpotassium
n-butyllithium
tert-butylpotassium
n-amylrubidium
tert-octylcesium
n-decyllithium
nonylsodium
cyclohexyllithium
methylcyclohexylcesium
phenylsodium
naphthylpotassium
phenyllithium
4-butylphenylrubidium
phenylfrancium
p-tolylsodium
4-phenylbutylsodium 2,4-diethylphenyllithium
benzylsodium
4-cyclohexylphenyllithium
3-phenylcyclohexylpotassium
dilithiomethane
1,4-disodiobutane
1,10-dipotassiodecane
1,20-dirubidioeicosane
1,4-difranciocyclohexane
1,4-dicesiobenzene
1,5-dilithionaphthalene
1,2-dilithio-1,2-diphenylethane
1,5-disodioanthracene
1,2-dipotassio-1,8-diphenyloctane
1,3,5-trilithiopentane
1,5,10-trifranciodecane
1,5,15-tricesioeicosane
1,3,5-trisodiocyclohexane
1,2,5-tripotassionaphthalene
1,3,5-trilithioanthracene
1,3,5,8-tetralithiodecane
1,5,10,20-tetrasodioeicosane
1,2,4,6-tetrapotassiocyclohexane
1,2,3,5-tetracesio-4-hexylanthracene
1,4-disodio-2-butene
1,4-dilithio-2-methyl-2-butene
1,4-dilithio-2-butene
1,4-dipotassio-2-butene
1,5-dilithio-3-pentyne
1,8-disodio-5-octyne
1,7-dipotassio-4-heptyne
1,10-dicesio-4-decyne
1,11-dirubidio-5-hendecyne and the like.

The terminally bonded acetylenic products produced by the process of this aspect of the invention have the formula R″C≡CH and include:

methylacetylene (propyne)
1-butyne
3-methyl-1-butyne
1-pentyne
3-methyl-1-pentyne
3-ethyl-1-pentyne
3-propyl-6-methyl-1-heptyne
1-octyne
1-dodecyne
1-pentadecyne
3-methyl-1-heptyne
4-cyclohexyl-1-butyne
3-phenyl-1-butyne
4-phenyl-1-butyne
6-(4-tolyl)1-hexyne
3-methyl-5-phenyl-1-pentyne
3-dodecyl-1-pentadecyne
5-(3,4-dimethylcyclopentyl)1-pentyne
5-ethyl-7-phenyl-1-heptyne
3-(3-phenylcyclopentyl)1-heptyne
1,1-dicyclohexyl-2-propyne
1-phenyl-2-propyne
1-(4-methylcyclohexyl)2-propyne
1-(3-phenylcyclohexyl)2-propyne
1-(4-cyclopentylphenyl)2-propyne
9-cyclohexyl-1-nonyne
1-(2-methyl-4-n-hexylcyclopentyl)2-propyne
1-(3,5-diisopropylphenyl)2-propyne
1-(2-naphthyl)2-propyne
1-phenyl-2-benzyl-3-butyne
1,1-bis(4-tolyl)2-propyne
3,8-bis(4-tolyl)1-octyne
3,6-diphenyl-1-hexyne
1-(4-methyl-1-naphthyl)2-propyne and the like.

In the above formula, R″C≡CH, R′ is a monovalent hydrocarbon radical selected from the group consisting of saturated aliphatic, saturated cycloaliphatic and aromatic radicals and combinations thereof generally containing up to and including 12 carbon atoms.

The isomerization reaction is preferably conducted in a diluent such as a hydrocarbon or a polar compound, for example, an ether, a thioether (sulfide), or a tertiary amine. Appropriate hydrocarbon diluents include paraffins, cycloparaffins, and aromatics generally containing from 4 to 10 carbon atoms per molecule such as butane, n-pentane, h-hexane, isopentane, isooctane, n-decane, cyclohexane, methylcyclohexane, benzene, toluene, and xylene. Specific examples of polar diluents which can be used include diethyl ether, diisopropyl ether, di-n-propyl ether, ethyl isopropyl ether, methyl n-butyl ether, di-n-octyl ether, dibenzyl ether, diphenyl ether, anisole, dioxane, tetrahydrofuran, dimethoxyethane, trimethylamine, triethylamine, tri-n-propylamine, methyldiethylamine, N,N-dimethylaniline, tetramethylethylenediamine, pentaethyldiethylenetriamine, diethyl sulfide, di-n-propylsulfide, di-n-butylsulfide, ethyl n-propyl sulfide, isopropyl n-butyl sulfide, and the like. It is to be understood that mixtures of any of the foregoing diluents can be employed in the practice of the invention.

Organolithium compounds are presently preferred as isomerization catalysts, particularly when the process is conducted in the presence of a hydrocarbon diluent. Organolithium compounds such as propyllithiums, butyllithiums, and amyllithiums, are soluble in hydrocarbon and in such cases the reaction takes place in a homogeneous system.

The mole ratio of organometallic compound to the allene compound is at least 1:1. A large excess of the organometallic compound can be employed and, to a certain extent, the isomerization rate is affected by the concentration of this compound in the system. The mole ratio of organometallic compound to the allene compound for most purposes is in the range of 1:1 to 20:1, but larger amounts of the organometallic compound can be used. The preferred mole ratio of organometallic compound to the allene compound is in the range of 1:1 to 10:1.

The reaction temperature can be generally in the range of 0 to 150° C. (32 to 302° F.), preferably 30 to 120° C. (86 to 248° F.), but temperatures outside this range can be used. The reaction time is dependent upon the temperature. It will usually be in the range of 1 minute or less to 24 hours when the temperature is in the above-specified broad range. The reaction time for the preferred temperature range will be in the range of 5 seconds to 20 hours. Generally, longer times are required for lower temperatures. The reaction time is dependent, to some extent, upon the diluent. The rate of isomerization is frequently greater in the presence of a polar diluent than it is in the presence of a hydrocarbon.

The present invention provides a process for the production of terminal acetylenes from allenes. The terminally bonded acetylenes, especially methylacetylene, are useful as fuels for welding operations and jet engines. They serve as intermediates for the synthesis of various types of compounds such as aldehydes, nitriles, esters, halides, olefins, etc. They will undergo various types of condensation reactions to produce unsaturated ketones, alcohols, and the like.

Further according to the invention, mono- and polymetalated terminally bonded acetylenic compounds are produced by reacting an allene with an organoalkali metal compound. Generally, the conditions and starting materials are the same as for the production of the acetylenes except that the reaction product is not hydrolyzed to the acetylene. The products produced by this aspect of the invention have the formula

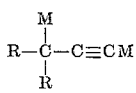

wherein each R is selected from hydrogen, M, and monovalent hydrocarbon radicals including saturated aliphatic, saturated cycloaliphatic and aromatic radicals generally having up to and including 12 carbon atoms, and M is an alkali metal.

Representative examples of some substituted 1-acetylene compounds contemplated within the above described formula include:

1,3-dilithiopropyne
1,3,3-trilithiopropyne
1,3,3,3-tetralithiopropyne
1,3,3-trilithio-1-butyne
1,3-dilithio-1-butyne
1,3-disodiopropyne
1,3,3-trisodiopropyne
1,3,3,3-tetrasodiopropyne
1,3-dipotassio-3-methyl-1-butyne
1,3-dilithio-3-methyl-1-pentyne
1,3-dirubidio-3-ethyl-1-pentyne
1,3-dicesio-3-propyl-6-methyl-1-heptyne
1,3-dipotassio-3-nonyl-1-dodecyne
1,3-difrancio-3-dodecyl-1-pentadecyne
1,3-trisodio-1-pentadecyne
1,3-dilithio-3-cyclopentyl-1-propyne
1,3,3-tripotassio-3-cyclopentyl-1-propyne
1,3-disodio-3,3-dicyclohexyl-1-propyne
1,3-disodio-3-cyclopentyl-1-propyne
1,3-dilithio-3,3-diphenyl-1-propyne
1,3-dilithio-3-(2-naphthyl)1-propyne
1,3,3-trirubidio-3-(2-naphthyl)1-propyne
1,3-dilithio-3-(benzyl)-4-phenyl-1-butyne
1,3-dilithio-3-cyclohexyl-1-butyne
1,3,3-tricesio-4-cyclohexyl-1-butyne
1,3-dilithio-3-(3-methylcyclopentyl)1-butyne
1,3,3-trifrancio-3-(4-methylcyclopentyl)-1-propyne
1,3-dilithio-3,3-bis(4-tolyl)1-propyne
1,3-disodio-3-(4-methylnaphthyl)1-propyne
1,3-dilithio-3-(4-cyclohexylphenyl)-1-butyne
1,3,3-tripotassio-3-(4-cyclohexylphenyl)1-propyne
1,3-dirubidio-3-(4-phenylcyclohexyl)1-propyne
1,3,3-trifrancio-3-(3-phenylcyclohexyl)1-propyne and the like.

The metalated acetylene reaction products can be deuterated quantitatively by reaction with deuterium oxide or can be used for other reactions involving replacement of the alkali metal atoms with other monovalent radicals such as $-CH_3$, $-C_2H_5$, $-COOH$, and the like as described in copending application Serial No. 247,326, filed Dec. 26, 1962. The metalated acetylenic compounds can also be used as polymerization initiators for the preparation of homopolymers and copolymers of conjugated dienes and other compounds containing an active $CH_2=C<$ group.

The following examples further illustrate the invention.

EXAMPLE I

Allene was isomerized in the presence of butyllithium at 122° F. The concentration of allene in the system was varied from 0.004 to 0.4 molar and the butyllithium/allene mole ratio was 5/1. The rate of isomerization was determined by gas-liquid chromatography (GLC). After isomerization was essentially complete, water was added to hydrolyze the mixture. The quantity of methyacetylene formed was determined by GLC. The isomerization recipes were as follows:

|  | A | B | C |
|---|---|---|---|
| n-Butyllithium, mmoles | 10 | 10 | 2 |
| Allene, mmoles | 2 | 2 | 0.4 |
| Isobutane,[1] mmoles | 6 | 6 | 2 |
| Cyclohexane, ml | 5 | 50 | 100 |
| Concentration of allene in system, M | 0.4 | 0.04 | 0.004 |
| Temperature, °F | 122 | 122 | 122 |
| Time, minutes | Variable | Variable | Variable |

[1] Used as an internal standard in GLC analysis.

Table I shows the rate of isomerization and the quantity of methylacetylene:

TABLE I

| Run No. | Recipe | Time, min. | n-Butane, mmoles | Allene, mmoles | Methylacetylene, mmoles |
|---|---|---|---|---|---|
| 1 | A | 8 | 2.38 | 1.20 |  |
| 2 | A | 13 | 3.72 | 0.65 |  |
| 3 | A | 20 | 5.35 | 0.18 |  |
| 4 | A | 35 | 6.40 | 0.03 |  |
| 5 | A | 48 | 6.86 | 0.03 |  |
| 6 | A | (¹) | 9.81 | Trace | 2.14 |
| 7 | B | 12 | 1.14 | 1.64 |  |
| 8 | B | 24 | 2.50 | 1.25 |  |
| 9 | B | 45 | 5.19 | 0.33 |  |
| 10 | B | 60 | 6.24 | 0.02 |  |
| 11 | B | 75 | 7.01 | 0.01 |  |
| 12 | B | (²) | 10.48 |  | 1.94 |
| 13 | C | 10 | 0.18 | 0.39 |  |
| 14 | C | 23 | 0.29 | 0.35 |  |
| 15 | C | 43 | 0.40 | 0.31 |  |
| 16 | C | 92 | 0.83 | 0.14 |  |
| 17 | C | 124 | 1.17 | 0.07 |  |
| 18 | C | 147 | 1.36 | 0.03 |  |
| 19 | C | 164 | 1.33 | 0.01 |  |
| 20 | C | (³) | 2.04 | 0.03 | 0.34 |

¹ Hydrolyzed after 121 minutes.
² Hydrolyzed after 120 minutes.
³ Hydrolyzed after 1,072 minutes.

The data show that isomerization occurred in all cases. The reaction was most rapid at the highest concentration of allene, about 35 minutes being required for essentially complete conversion to methylacetylene. At 0.04 molar allene concentration, isomerization was still quite rapid. The time required to complete the reaction was about an hour. The rate was slower when the allene concentration was 0.004 molar, around 2 to 2.5 hours being required to convert all of the allene to methylacetylene. The rate of butane liberation indicates that metalation occurred in addition to formation of the acetylide. All C—Li was converted to C—H during hydrolysis.

The effect of type of diluent on isomerization rate was investigated by substitution of n-hexane for cyclohexane in recipe C. Butane evolution and allene disappearance were almost identical with results obtained in the cyclohexane system.

EXAMPLE II

Allene was isomerized at different temperatures using recipe B of Example I. Data are presented in Table II.

TABLE II

| Run No. | Temp., °F. | Time, min. | n-Butane, mmoles | Allene, mmoles |
|---|---|---|---|---|
| 1 | 86 | 175 | 4.69 | 0.44 |
| 2 | 86 | 310 | 6.21 | 0.01 |
| 3 | 158 | 11 | 4.21 | 0.84 |
| 4 | 158 | 16 | 6.00 | 0.20 |
| 5 | 158 | 20 | 7.04 | 0.01 |

The data show that isomerization occurred at both temperatures but was more rapid at the higher temperature. The reaction was complete in about 20 minutes at 158° F. whereas around 5 hours was required at 86° F.

EXAMPLE III

Allene was isomerized in the presence of butyllithium at 122° F. using a 1/1 butyllithium/allene mole ratio. The recipe was as follows:

n-Butyllithium, mmoles _____ 2
Allene, mmoles _____ 2
Isobutane, mmoles _____ 6
Cyclohexane, ml. _____ 50
Concentration of allene in system, M _____ 0.04
Temperature, °F. _____ 122
Time, minutes _____ Variable The procedure was the same as described in Example I. After 5 hours the amount of allene that remained in the system was 0.29 millimoles. The mixture was then hydrolyzed. The amount of methylacetylene, as determined by GLC, was 1.82 millimoles. These data show that isomerization of allene to methylacetylene occurred at a 1/1 butyllithium/allene mole ratio.

EXAMPLE IV

Allene was isomerized to methylacetylene in the presence of tetralithiomethylacetylene. The following recipe was used:

| | |
|---|---|
| Tetralithiomethylacetylene, mmoles | 2 |
| Allene, mmoles | 2 |
| Isobutane, mmoles | 6 |
| Cyclohexane, ml. | 100 |
| Concentration of allene in system, M | 0.02 |
| Temperature, °F. | 122 |
| Time, minutes | Variable |

The procedure was the same as described in Example I. Results are presented in Table III.

TABLE III

| Run No. | Time, min. | Allene, mmoles |
|---|---|---|
| 1 | 6 | 0.58 |
| 2 | 15 | 0.37 |
| 3 | 38 | 0.21 |
| 4 | 68 | 0.11 |
| 5 | 100 | 0.08 |
| 6 | 146 | 0.04 |

The mixture was hydrolyzed after 146 minutes and gave 4.01 millimoles of methylacetylene. The data show that the rate of allene depletion was very rapid with 75 percent of the allene being isomerized after only 6 minutes. The lithiated methylacetylene was a very effective isomerization agent. Furthermore, the lithiated methylacetylene was converted to methylacetylene upon hydrolysis.

Metalation of methylacetylene was effected in accordance with the process disclosed and claimed by Hsieh and Favre in copending application Ser. No. 247,326, filed Dec. 26, 1962, by treating methylacetylene with butyllithium.

EXAMPLE V

Methylallene (1,2-butadiene) was isomerized to 1-butyne in the presence of butyllithium in accordance with the following recipe:

| | |
|---|---|
| n-Butyllithium, mmoles | 10 |
| Methylallene, mmoles | 2 |
| Isobutane, mmoles | 6 |
| Cyclohexane, ml. | 50 |
| Temperature, °F. | 122 |
| Time, minutes | Variable |

The procedure of Example I was used. Results are presented in Table IV.

TABLE IV

| Run No. | Time, min. | n-Butane, mmoles | Methylallene, mmoles |
|---|---|---|---|
| 1 | 7 | 0.30 | 1.79 |
| 2 | 36 | 0.40 | 1.75 |
| 3 | 115 | 0.74 | 1.38 |
| 4 | 209 | 1.64 | 1.04 |
| 5 | 316 | 2.34 | 0.57 |

The mixture was hydrolyzed after 316 minutes. The amount of 1-butyne formed was 1.33 millimoles. There was no evidence of formation of 2-butyne or 1,3-butadiene. These data show that the process of the invention was operable for the production of 1-butyne from methylallene.

EXAMPLE VI

Deuterated methylacetylene was prepared from allene by first isomerizing the allene in the presence of butyllithium and then treating the lithiated product with deuterium oxide. The isomerization recipe was as follows:

| | |
|---|---|
| n-Butyllithium, mmoles | 10 |
| Allene, mmoles | 2 |
| Isobutane, mmoles | 6 |
| Cyclohexane, ml. | 50 |
| Temperature, °F. | 122 |
| Time, minutes | Variable |

Two runs were made. One run was shortstopped with an excess of deuterium oxide after a reaction period of 30 minutes and the other run after approximately 16 hours. The products were analyzed by mass spectrometry. The quantities of the mono-, di, tri-, and tetralithiated products were calculated from the quantities of the several deuterated methylacetylenes. Data are presented in Table V.

TABLE V

| Run No. | Time | Allene,[1] mmoles | Lithiated Methylacetylene, mmoles | | | | |
|---|---|---|---|---|---|---|---|
| | | | Mono- | Di- | Tri- | Tetra- | Total |
| 1 | 30 mins | 0.94 | 0.08 | 0.27 | 0.38 | 0.31 | 1.04 |
| 2 | 16 hours | 0.26 | 0 | 0.18 | 0.37 | 1.31 | 1.87 |

[1] After hydrolysis

These data show that mono- and polylithiated terminal acetylenes can be prepared from allene by treatment with an organolithium compound and that the corresponding deuterated products can be produced by treatment of the reaction mixtures with deuterium oxide. The data also show that longer times of reaction favor the production of tetralithiated methylacetylene and of total lithiated acetylene product.

EXAMPLE VII

The following recipe was employed for the production of methylacetylene from allene in the presence of butyllithium:

| | |
|---|---|
| n-Butyllithium, mmoles | 10 |
| Allene, mmoles | 2 |
| Isobutane, mmoles | 6 |
| Diethyl ether, ml. | 50 |
| Cyclohexane, ml. | 6 |
| Temperature, °F. | 86 |

The isomerization reaction was very rapid. No allene remained after one minute. The mixture was hydrolyzed after one hour. Analysis by GLC showed 1.86 millimoles of methylacetylene. These data show that very rapid isomerization of allene to methylacetylene occurred in the presence of the polar diluent.

Reasonable variation and modification are possible within the scope of the foregoing disclosure and the appended claims to the invention, the essence of which is that allenes are isomerized to terminally bonded acetylenic compounds in the presence of an organoalkali metal compound.

We claim:

1. A process for the isomerization of allenes to terminally bonded acetylenic compounds comprising contacting in the substantially liquid phase at least one allene having the formula

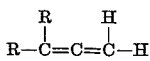

wherein each R is selected from the group consisting of hydrogen and monovalent hydrocarbon radicals containing up to 12 carbon atoms, inclusive; and at least one organoalkali metal compound containing up to 20 carbon atoms, inclusive; hydrolyzing the reaction mixture, and recovering at least one terminally bonded acetylene.

2. The process of claim 1 wherein the organoalkali metal compound is at least one organolithium compound selected from the group consisting of propyllithium, butyllithium, and amyllithium; and the reaction is conducted in a hydrocarbon diluent.

3. The process of claim 1 wherein the reaction is conducted in a liquid diluent selected from at least one of the group consisting of hydrocarbon and polar compounds.

4. The process of claim 3 wherein the reaction temperature is in the range of 32 to 302° F., the mole ratio of organometallic compound to allene is in the range of 1:1 to 20:1 and the time of the reaction is in the range of 5 seconds to 24 hours.

5. A process for the isomerization of allenes to at least one of the group consisting of mono- and polymetalated acetylene compounds comprising contacting in the substantially liquid phase at least one allene having the formula

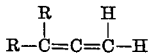

wherein each R is selected from the group consisting of hydrogen and monovalent hydrocarbon radicals containing up to 12 carbon atoms, inclusive; and at least one organoalkali metal compound containing up to 20 carbon atoms, inclusive; and recovering at least one metalated acetylene.

6. The process of claim 5 wherein the reaction is conducted in at least one liquid diluent selected from the group consisting of hydrocarbon and polar compounds.

7. A process for the isomerization of allene to methyl acetylene which comprises contacting allene in the liquid phase with butyllithium at a butyllithium/allene mole ratio of at least 1/1 in a cyclohexane diluent for a time sufficient to complete the reaction, hydrolyzing the reaction mixture, and recovering the methyl acetylene.

8. The process of claim 7 wherein the butyllithium/allene mole ratio is in the range of 1/1 to 20/1 and the temperature is in the range of 32 to 302° F.

9. A process for the isomerization of methyl allene to 1-butyne which comprises contacting in the substantially liquid phase butyllithium and methyl allene in a cyclohexane diluent for a time sufficient to complete the reaction, hydrolyzing the reaction mixture, and recovering the 1-butyne.

10. A process for the isomerization of allene to methyl acetylene which comprises contacting in the substantially liquid phase allene and butyllithium in a diethyl ether diluent, hydrolyzing the reaction mixture, and recovering methyl acetylene.

11. The process of claim 5 wherein the organoalkali metal compound is at least one organolithium compound selected from the group consisting of propyllithium, butyllithium, and amyllithium, the reaction temperature is in the range of 32 to 302° F., the mole ratio of organolithium compound to allene is in the range of 1:1 to 20:1, and the time of the reaction is in the range of 5 to 24 hours.

References Cited
UNITED STATES PATENTS

| | | | |
|---|---|---|---|
| 2,594,706 | 4/1952 | Allan | 260—678 |
| 2,649,485 | 8/1953 | Williams, et al. | 260—679 |
| 3,303,225 | 3/1967 | Hsieh et al. | 260—665 |

DELBERT E. GANTZ, *Primary Examiner.*

J. D. MYERS, *Assistant Examiner.*